(12) United States Patent
Furuichi et al.

(10) Patent No.: US 9,582,649 B2
(45) Date of Patent: *Feb. 28, 2017

(54) PROCESSING DATA STORED IN EXTERNAL STORAGE DEVICE

(75) Inventors: Sanehiro Furuichi, Yamato (JP);
Yasuhide Niimura, Yamato (JP);
Masami Tada, Yamato (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 708 days.

This patent is subject to a terminal disclaimer.

(21) Appl. No.: 13/529,674

(22) Filed: Jun. 21, 2012

(65) Prior Publication Data

US 2012/0265999 A1 Oct. 18, 2012

Related U.S. Application Data

(63) Continuation of application No. 12/719,072, filed on Mar. 8, 2010, now Pat. No. 8,312,293.

(30) Foreign Application Priority Data

Mar. 31, 2009 (JP) .................................. 2009-86276

(51) Int. Cl.
*G06F 21/10* (2013.01)
(52) U.S. Cl.
CPC .................................... *G06F 21/10* (2013.01)
(58) Field of Classification Search
None
See application file for complete search history.

(56) References Cited

U.S. PATENT DOCUMENTS

| 7,519,763 B2 | 4/2009 | McLean |
| 7,549,051 B2 | 6/2009 | Dillaway et al. |

(Continued)

FOREIGN PATENT DOCUMENTS

| EP | 1821230 B1 | 8/2008 |
| JP | 2002-268951 A | 9/2002 |

(Continued)

OTHER PUBLICATIONS

Zugenmaier et al. (EP1821230B1 published Aug. 22, 2007).*

(Continued)

*Primary Examiner* — Oleg Korsak
(74) *Attorney, Agent, or Firm* — Cuenot, Forsythe & Kim, LLC

(57) ABSTRACT

An external storage device connectable to an information processing apparatus is provided. The storage device includes: an input/output interface via which data is exchanged with an information processing apparatus; a first storage region where data associated with first and second validity periods is stored; and a second storage region where a control program is stored. While the first validity period is used when the external storage device is connected to one information processing apparatus, the second validity period is used when the external storage device is connected to another information processing apparatus. The control program causes a processor to execute the steps of: establishing connection of the external storage device to an information processing apparatus; identifying any one of the validity periods as a validity period to be used for the data; and executing predetermined security protection processing on the data in accordance with the identified validity period.

20 Claims, 10 Drawing Sheets

(56) References Cited

U.S. PATENT DOCUMENTS

| | | |
|---|---|---|
| 7,801,819 B2 | 9/2010 | Swenson et al. |
| 7,861,274 B2 | 12/2010 | Chen et al. |
| 7,917,963 B2 | 3/2011 | Goyal et al. |
| 8,108,691 B2 | 1/2012 | Holtzman et al. |
| 8,132,025 B2 | 3/2012 | Tanaka et al. |
| 8,181,236 B2 | 5/2012 | Banerjee et al. |

FOREIGN PATENT DOCUMENTS

| | | |
|---|---|---|
| JP | 2006-059385 A | 3/2006 |
| JP | 2007-220122 A | 8/2007 |
| JP | 2007-241562 A | 9/2007 |

OTHER PUBLICATIONS

Michael K. Just (On the Temporal Authentication of Digital Data, Dec. 1998).*
Zugenmaier et al. (EP1998270A1 published Mar. 12, 2008).*
Zugenmaier, A., et al., "Transparent Encryption for External Storage Media with Key Management Adapted to Mobile Use," In Proc. of 2009 Annual Computer Security Applications Conference (ACSAC '09), IEEE Computer Society, Dec. 7-11, 2009, 7 pgs.

* cited by examiner

PROCESSING DATA STORED IN EXTERNAL STORAGE DEVICE

CROSS-REFERENCE TO RELATED APPLICATIONS

This application is a Continuation of U.S. application Ser. No. 12/719,072, filed on Mar. 8, 2010. which claims priority to Japan Patent Application No. 200986276 filed Mar. 31, 2009, each of which is hereby incorporated by reference.

BACKGROUND OF THE INVENTION

The present invention relates to an information processing technology. To be more specific, the present invention relates to an external storage device, and to a method, program and information processing apparatus that are used for processing data stored in an external storage device.

In recent years, with technological advancements such as miniaturization and improved mass productivity of memory devices, external storage devices for personal computers, digital multifunctional machines and other information processing apparatuses have become easily available. Those external storage devices include an external storage device provided with a USB (Universal Serial Bus) terminal as a data input/output interface (such a device is hereinafter also referred to simply as a "USB memory").

With an external storage device, a user of the external storage device can easily transport data between plural information processing apparatuses by moving data, such as files, into the external storage device from an information processing apparatus having a data input/output interface, and then by retrieving the data on another information processing apparatus.

However, the facilitating of data transport by use of external storage devices has in turn been increasing security concerns over information leakage and other problems. For this reason, companies in the related industry have been conducting research and development on techniques for solving security problems accompanying the spread of external storage devices.

As a background technique related to the above problems, Japanese Patent Application Publication No. 2006-146744 discloses a removable medium information management system configured as below. The removable medium information management system previously set a content validity period in an offline environment for content stored in a removable medium, the set content validity period being different from and shorter than the original validity period of the content. The removable medium information management system updates and extends the content validity period in an offline environment when the removable medium is once used on a PC having been connected to and authenticated by an authentication.

As another background technique, Japanese Patent Application Publication No. 2007-66288 discloses a data processing apparatus capable of preventing use of data in a storage medium which has expired. The data processing apparatus acquires an expiration date and time of digital data stored in a removable medium having been made usable, and acquires current date and time information. Then, the data processing apparatus determines, by comparing the acquired current date and time with the acquired expiration date and time, whether or not the digital data has expired. If determining that the digital data has expired, the data processing apparatus warns that the data having expired is stored in the removable medium.

As another background technique, Japanese Patent Application Publication No. 2007-249575 discloses an information processing apparatus including connection monitoring means which monitors whether a transportable recording medium is connected to the information processing apparatus, and security check activation means. In the transportable recording medium, there are recorded: target information to be used in processing; apparatus identification information unique to every information processing apparatus which uses the target information; and a security check program which functions as use judgment means for judging whether or not an information processing apparatus has a right to use the target information by use of the apparatus identification information, and as use control means for performing control so that the information processing apparatus can use the target information if the use judgment means judges that the information processing apparatus has the right, and whose execution is limited. The security check activation means activates the use judgment means included in the security check program when the connection monitoring means detects the connection of the transportable recording.

As another background technique, Japanese Patent Application Publication No. 2007-257616 discloses a recording medium being attachable to and detachable from plural host apparatuses, and having digital data recorded therein. The recording medium includes: judgment means that judges whether or not the digital data is usable; and deletion means that deletes the digital data if the digital data is judged as being unusable. The recording medium records therein information indicating a validity period of the digital data. By using the information, the judgment means judges whether or not the digital data has expired. The deletion means deletes the digital data if the digital data is judged to have.

As another background technique, Japanese Patent Application Publication No. 2008-140127 discloses a secondary storage device for a computer. The secondary storage device is attachable to and detachable from a computer and which includes information storage means that stores, in the secondary storage device, information to be read by the computer or information written by the computer. The device includes: validity period storage means that retains information on a validity period of stored information, which is set upon attachment of the device to the computer or upon saving of the stored information after the attachment of the device; and validity period management means that, when the device is attached again to the computer after being detached therefrom, prior to enabling the computer to read the stored information, deletes or inhibits reading of the stored information if the validity period of the stored information stored in the validity period storage means is over.

The user of an external storage device may in some cases need to use different validity periods respectively for apparatuses to each of which the external storage device is connected in order to perform security control over data stored in the external storage device. For example, the user may need to prevent a thief of the external storage device from accessing data in the device as reliably as possible in such away as to: set a longer validity period of data for a personal computer used for storing the data in the external storage device for the first time (which is most likely to be one owned by the user himself or herself); and set a shorter validity period thereof for an apparatus other than the above personal computer. However, the above need is not met by any of prior techniques including the above-described Patent Literatures.

One of objectives of the present invention is to provide an improved external storage device, method, program and information processing apparatus that are advantageous in enhancing security of data stored in the external storage device used for information processing apparatuses.

Another one of the objectives of the present invention is to provide an improved external storage device, method, program and information processing apparatus that are advantageous in setting, for data stored in the external storage device to be connected by information processing apparatuses, different validity periods respectively for the information processing apparatuses.

Still another one of the objectives of the present invention is to provide an improved external storage device, method, program and information processing apparatus that are advantageous in enhancing security of data stored in the external storage device to be connected by information processing apparatuses, by use of different validity periods set respectively for the information processing apparatuses.

SUMMARY OF THE INVENTION

In order to achieve the objectives described above, there is provided an external storage device connectable to an information processing apparatus. The external storage device includes: an input/output interface via which data is exchanged with an information processing apparatus; a first storage region in which data associated with first and second validity periods is stored; and a second storage region in which a control program is stored. The first validity period is used on condition that the external storage device is connected to one information processing apparatus, and the second validity period is used on condition that the external storage device is connected to another information processing apparatus. In the external storage device, the control program causes a processor to execute the steps of: establishing connection of the external storage device to an information processing apparatus via the input/output interface; identifying any one of the first and second validity periods as a validity period to be used for the data, in accordance with the information processing apparatus to which the external storage device is connected; and executing predetermined security protection processing on the data in accordance with the thus identified validity period. Preferably, the first validity period is encrypted with an encryption key unique to the one information processing apparatus.

Preferably, the identifying step includes the steps of: attempting to decrypt the first validity period encrypted with the encryption key unique to the one information processing apparatus; and upon success of the decryption of the first validity period, identifying the decrypted first validity period as the validity period to be applied to the data.

Preferably, the identifying step includes the steps of: attempting to decrypt the first validity period encrypted with the encryption key unique to the one information processing apparatus; and upon failure of the decryption of the first validity period, identifying the second validity period as the validity period to be applied to the data.

Preferably, while the first validity period is used on condition that the external storage device is connected to an information processing apparatus on which an operation of saving the data associated with the first and second validity periods into the external storage device is performed, the second validity period is used on condition that the external storage device is connected to an information processing apparatus of another user. The first validity period may be set longer than the second validity period.

Preferably, the first and second validity periods are generated upon an operation of saving the data into the external storage device. Preferably, the first storage region includes a confidential region to be accessed via the control program, and the first and second validity periods are stored in the confidential region.

Preferably, the identifying step includes the steps of: comparing a current date and time with a saved date and time of the data; and if the current date and time is earlier than the saved date and time, determining the data as having expired. More preferably, upon connection of the external storage device to an information processing apparatus, the saved date and time of the data is updated.

Preferably, the executing step includes the steps of: determining, by comparing a current date and time with the identified validity period, whether or not the data has expired; and executing the predetermined security protection processing on the data if it is determined in the determining step that the data has expired.

There is provided an information processing apparatus connectable to an external storage device. The information processing apparatus includes: an input/output interface via which data is exchanged with an external storage device; a setting unit which generates first and second validity periods for data to be stored in the external storage device; and a saving unit which saves, into the external storage device via the input/output interface, the first and second validity periods associated with the data. The first validity period is used on condition that the external storage device is connected to one information processing apparatus, and the second validity period is used on condition that the external storage device is connected to another information processing apparatus. Preferably, the first validity period is encrypted with an encryption key unique to the one information processing apparatus.

Although the summary of the present invention has been described above as an external storage device or an information processing apparatus, the present invention can also be regarded as a method, program or program product used for processing data stored in an external processing device. The program can be configured to cause a computer to execute the steps of the method. The program product can be configured to include a storage medium that stores therein the above-described program, or to include a medium that transfers the program.

It should be noted that the summary of the invention described above does not list all of characteristics necessary for the present invention, and that any combination or sub-combination of those components can also be included in the present invention.

BRIEF DESCRIPTION OF THE DRAWING

For a more complete understanding of the present invention and the advantage thereof, reference is now made to the following description taken in conjunction with the accompanying drawings.

DETAILED DESCRIPTION OF THE PREFERRED EMBODIMENT

Figure 1:
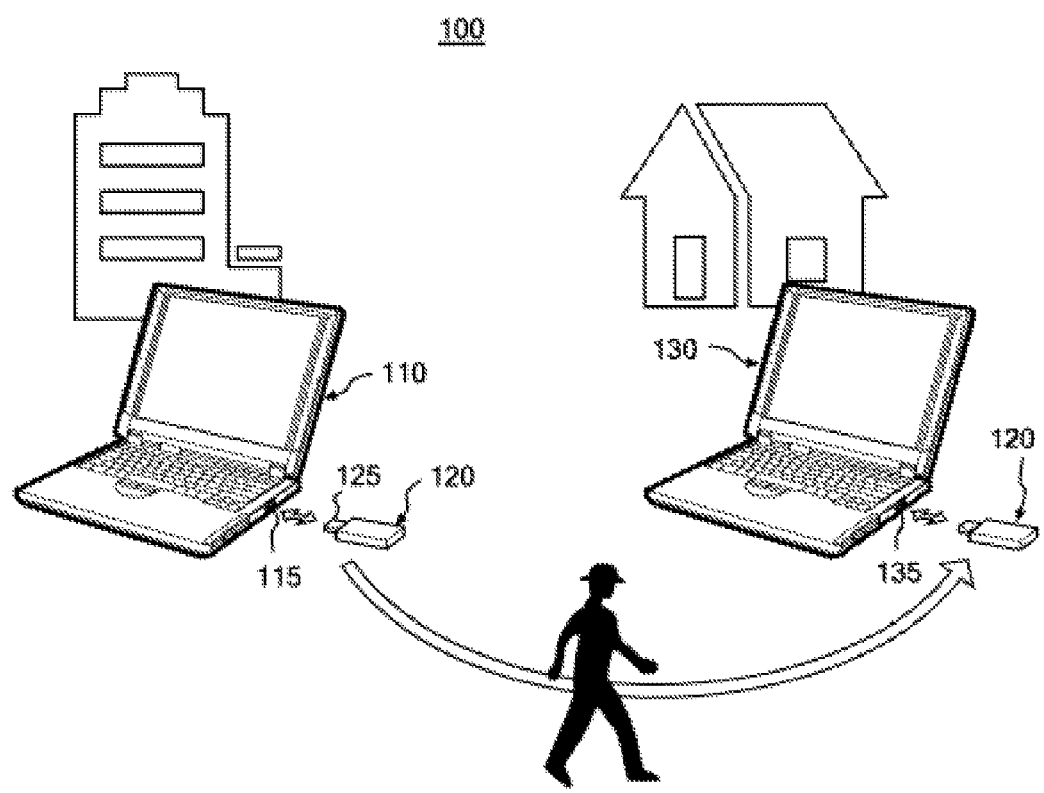
FIG. 1 is a high-level schematic diagram of an entirety of a data processing system of an embodiment of the present invention.

Although the best mode for carrying out the present invention will be described in detail below based on the drawings, the following embodiment is not intended to limit the invention according to the scope of claims, and not all of characteristics described in the embodiment are necessarily essential for solving means of the invention.

Additionally, the present invention can be carried out in various different aspects and should not be interpreted as being limited by contents described in the embodiment. Additionally, it should be noted that not all of characteristics described in the embodiment are necessarily essential for solving means of the invention. Throughout the embodiment, the same reference numerals are given to the same elements.

FIG. 1 is a high-level, overall schematic diagram illustrating a data processing system 100 of the embodiment of the present invention. The data processing system 100 of the embodiment of the present invention includes: a USB memory 120; a computer 110 of a user who is an owner of the USB memory 120; and one or more different computers 130.

Although a notebook (or laptop) personal computer can be employed as the computer 110 of the embodiment of the present invention as illustrated in FIG. 1, the computer 110 is not limited thereto. Instead, various information processing apparatuses can be employed including, for example, a PDA (Personal Digital Assistant), a smart phone, a desktop personal computer and a digital multifunctional machine.

In a case where the computer 110 is a notebook personal computer, there is an operating system, such as Microsoft®[1] Windows, installed in the computer 110. The computer 110 includes a USB terminal 115 that is an input/output interface through which the computer 110 can exchange data with the USB memory 120. Furthermore, the computer 110 has a security chip installed therein, the security chip handling an encryption key used for encrypting at least a part of plural validity periods used in later described security protection processing for a file stored in the USB memory 120.

[1] Microsoft and Windows are trademarks of Microsoft Corporation in the United States, other countries, or both.

Additionally, although a notebook (or laptop) personal computer can be employed as each of the one or more different computers 130 as illustrated in FIG. 1, the different computer 130 is not limited thereto. Note that each of the one or more different computers 130 may as well include a security chip that handles the above encryption key.

The USB memory 120 of the embodiment of the present invention includes a USB terminal 125 used for exchanging data (which typically is a file) with an information processing apparatus. The USB memory 120 is capable of receiving and storing therein files from an information processing apparatus including a USB terminal. Consequently, the user of the USB memory 120 can easily transport data between plural information processing apparatuses by moving the data from an information processing apparatus into the USB memory 120, and retrieving the data on another information processing apparatus.

Additionally, the USB memory 120 of the embodiment of the present invention is capable of storing therein plural validity periods associated with each of the files. Whether or not each file has expired is determined by use of any one of those plural validity periods, and the security protection processing is executed for the file having expired.

In the embodiment of the present invention, one of the plural validity periods is used when the USB memory 120 is connected to an information processing apparatus that stores therein original data of a file copied to and stored in the USB memory 120 (hereinafter, such an apparatus is referred to as a "copy-source apparatus," and such a validity period (or expiration date and time) for the copy-source apparatus is also referred to as a "copy-source apparatus validity period" (or a "copy-source apparatus expiration date and time")). Additionally, another one of the plural validity periods is used when the USB memory 120 is connected to any of different information processing apparatuses (hereinafter, such apparatuses are referred to as "copy-destination apparatuses," and such a validity period (or expiration date and time) for the copy-destination apparatuses is also referred to as a "copy-destination apparatus validity period" (or a "copy-destination apparatus expiration date and time")).

Note that, in a scenario of the embodiment of the present invention, while the copy-source apparatus is the computer 110, the copy-destination apparatuses are the one or more different computers 130.

Figure 2:
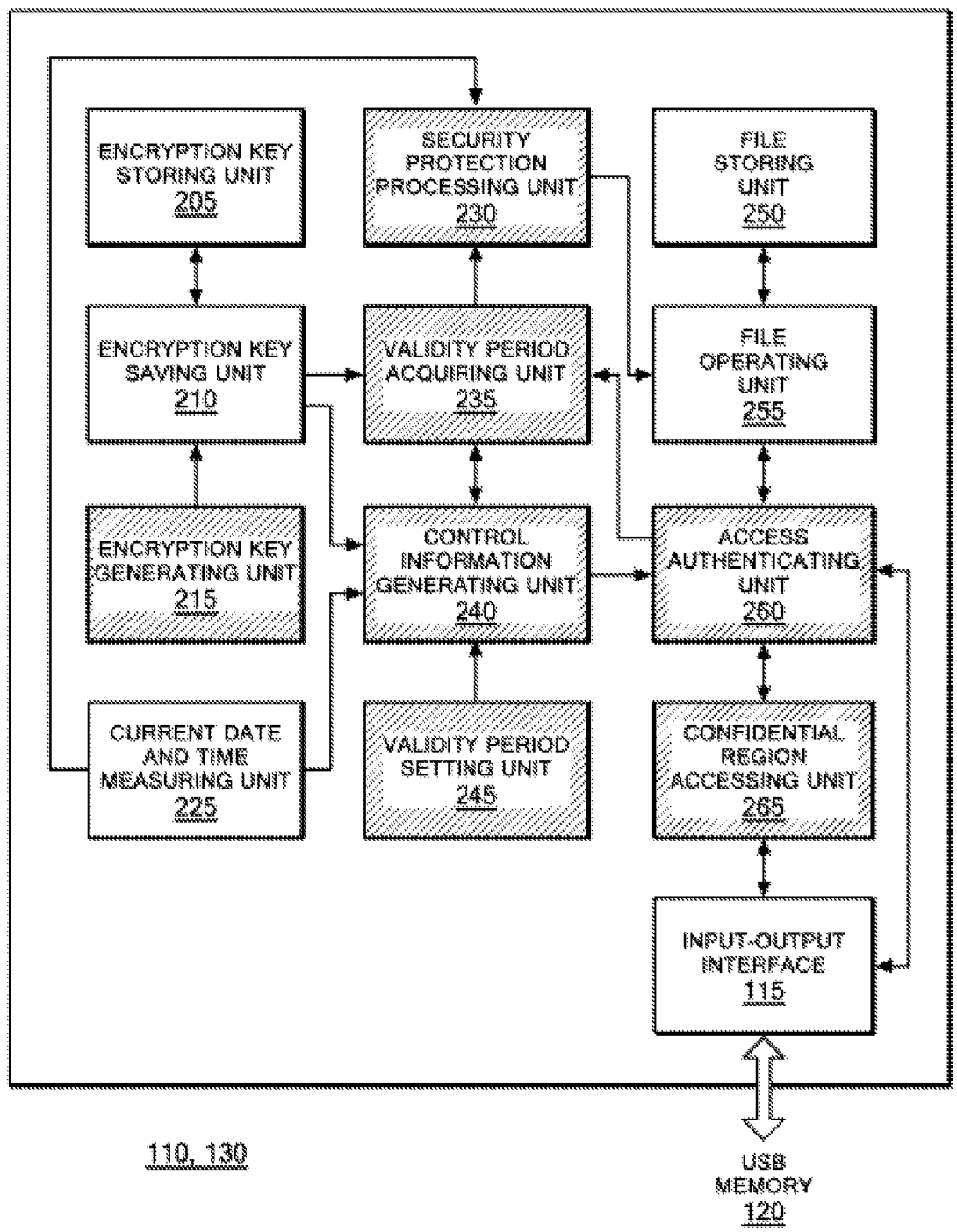
FIG. 2 is a functional block diagram of a personal computer of the embodiment of the present invention.

FIG. 2 is a functional block diagram of the computer 110 of the user according to the embodiment of the present invention. In an information processing apparatus having a hardware configuration later described by use of FIG. 9, elements shown in the functional block diagram in FIG. 2 can be realized by causing a main CPU 1 to read computer programs loaded on a main memory 4 and then causing hardware resources and software to operate in concert with each other, the computer programs including an operating system, middleware and an application program that are stored in a hard disk drive 13 and the like, and a control program stored in the USB memory 120.

The computer 110 of the user according to the embodiment of the present invention includes an encryption key storing unit 205, an encryption key saving unit 210 and an encryption key generating unit 215. The encryption key storing unit 205 and the encryption key saving unit 210 are realized by a security chip 21 of the information processing apparatus in FIG. 9. Since a security chip technology is well known, detailed explanation thereof will be omitted in this description. Additionally, the encryption key generating unit 215 is realized by an encryption key generating code 322 of a control program 320 stored in the USB memory 120.

The encryption key storing unit 205 of the embodiment of the present invention is capable of storing therein an encryption key generated by the encryption key generating unit 215. In the embodiment of the present invention, it is assumed that the encryption key is unique to the information processing apparatus, and is a common key which is used for both encryption and decryption. The encryption key storing unit 205 can be accessed only by the encryption key saving unit 210, whereby extremely high security of the stored encryption key is maintained.

The encryption key saving unit 210 of the embodiment of the present invention receives an encryption key from the encryption key generating unit 215 and saves the encryption key into the encryption key storing unit 205. Additionally, the encryption key saving unit 210 retrieves an encryption key stored in the encryption key storing unit 205 and hands over the encryption key to a validity period acquiring unit 235 so that the validity period acquiring unit 235 may decrypt an encrypted validity period. Furthermore, the encryption key saving unit 210 retrieves an encryption key stored in the encryption key storing unit 205 and hands over the encryption key to a control information generating unit 240 so that the control information generating unit 240 may encrypt a validity period and include the encrypted validity period into control information.

The encryption key generating unit 215 of the embodiment of the present invention is used for generating, when the USB memory 120 is connected to an information processing apparatus for the first time, an encryption key unique to the information processing apparatus that is the computer 110. As has been already described, the thus generated encryption key is securely stored in the encryption key storing unit 205 via the encryption key saving unit 210.

Furthermore, the computer 110 of the user according to the embodiment of the present invention includes a current date and time measuring unit 225. The current date and time measuring unit 225 is realized by a timer 17 of the information processing apparatus in FIG. 9. The current date and time measuring unit 225 transmits current date and time information to a security protection processing unit 230 so that the security protection processing unit 230 may determine whether or not a file has expired. Additionally, the current date time measuring unit 225 transmits the current date and time information to a control information generating unit 240 so that the control information generating unit 240 may generate control information.

Furthermore, the computer 110 of the user according to the embodiment of the present invention includes the security protection processing unit 230 and the validity period acquiring unit 235. The security protection processing unit 230 and the validity period acquiring unit 235 are respectively realized by a security protection processing code 330 and a validity period acquiring code 328 of the control program 320 stored in the USB memory 120.

The security protection processing unit 230 of the embodiment of the present invention compares the current date and time information received from the current time measuring unit 225 with the expiration date and time received from the validity period acquiring unit 235, thereby determining whether or not a file stored in the USB memory 120 has expired. Additionally, the security protection processing unit 230 compares the current date and time information with a file save date and time 410 received from the validity period acquiring unit 235. If it is determined that the current date and time is earlier than the file save date and time 410, it is high likely that the current date and time has been falsified through deliberate change of a timer. For this reason, it is forcibly determined that the file has expired. Furthermore, the security protection processing unit 230 executes the security protection processing on the file thus determined to have expired. In the embodiment of the present invention, the security protection processing is deletion of the expired file.

The validity period acquiring unit 235 of the embodiment of the present invention receives control information 400 acquired from a confidential region 360 of the USB memory 120 via a confidential region accessing unit 265 and an access authenticating unit 260. Thereafter, the validity period acquiring unit 235 decrypts encrypted validity periods contained in the control information 400 by using an encryption key received from the encryption key saving unit 210, and thus identifies and acquires a validity period that should be applied to a file. The validity period acquiring unit 235 transmits the thus acquired validity period together with the file save date and time information to the security protection processing unit 230.

Furthermore, the computer 110 of the user according to the embodiment of the present invention includes the control information generating unit 240 and a validity period setting unit 245. The control information generating unit 240 and the validity period setting unit 245 are realized respectively by a control information generating code 326 and a validity period setting code 324 of the control program 320 stored in the USB memory 120.

Figure 4:
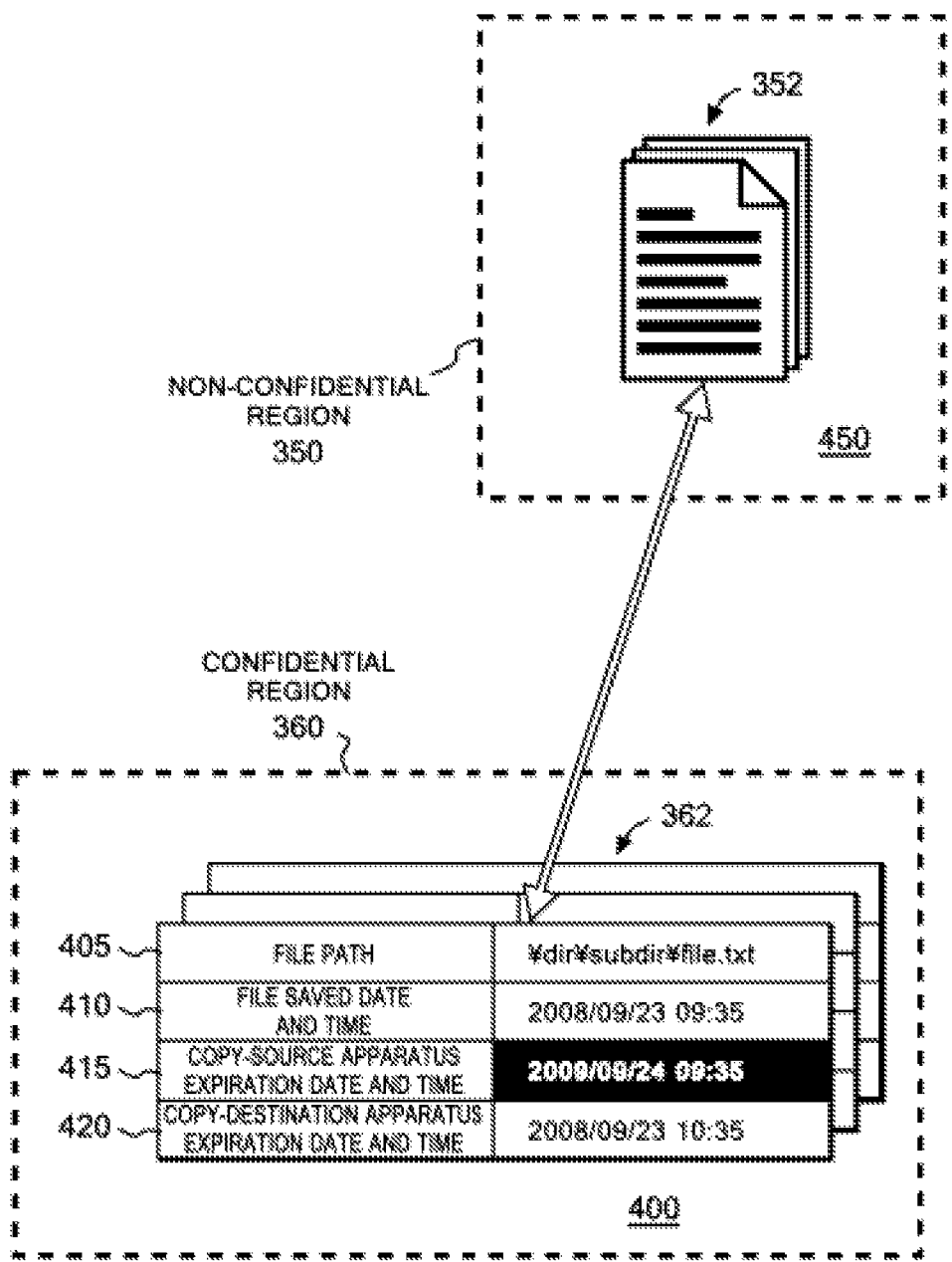
FIG. 4 is a diagram expressing one example of a data structure of data stored in the USB memory of the embodiment of the present invention.

The control information generating unit 240 of the embodiment of the present invention generates, on the basis of default values such as the current date and time information received from the current date and time measuring unit 225 and (or) the validity period set by the user via the validity period setting unit 245, the control information 400 shown in FIG. 4, and transmits the thus generated control information 400 to the USB memory 120 via the access authenticating unit 260 and the confidential region accessing unit 265. The thus transmitted control information 400 is stored in a control information storing unit 362 of the confidential region 360. A structure and the like of the control information 400 will be described later in detail by use of FIG. 4.

The validity period setting unit 245 of the embodiment of the present invention provides an interface used for causing the user to set a validity period of a file that should be stored in the USB memory 120. Specifically, the validity period setting unit 245 displays, on a display of the computer 100 of the user, a graphical user interface that prompts the user to input validity periods (a copy-source apparatus validity period and a copy-destination apparatus validity period), and hands over the thus inputted validity periods to the control information generating unit 240. In the embodiment of the present invention, the validity period setting unit 245 is configured to hand over predetermined default values as the validity periods to the control information generating unit 240 in a case where the user is not permitted to set the validity periods of the file or where the user has not specified the validity periods of the file.

Furthermore, the computer 110 of the user according to the embodiment of the present invention includes a file storing unit 250 and a file operating unit 255. The file storing unit 250 and the file operating unit 255 are realized respectively by a storage device such as the hard disk drive (HDD) 13 or the like of the information processing apparatus in FIG. 9, and a file system of the operating system.

The file storing unit 250 of the embodiment of the present invention is capable of storing therein data of various files including a file that should be stored in the USB memory 120. The file operating unit 255 of the embodiment of the present invention is capable of executing operations (such as creation, change, move and deletion) on files stored in the file storing unit 250 and in a file storing unit 352 of the USB memory 120.

Furthermore, the computer 110 of the user according to the embodiment of the present invention includes the access authenticating unit 260, the confidential region accessing unit 265 and the input/output interface 115. The access authenticating unit 260 and the confidential region accessing unit 265 are realized respectively by an access authenticating code 332 and a confidential region accessing code 334 of the control program 320 stored in the USB memory 120. The input/output interface 115 is realized by a USB port 22 of the information processing apparatus in FIG. 9.

The access authenticating unit 260 of the embodiment of the present invention is used by the user or the like for executing authentication processing for accessing data stored in a readable and writable region 340 of the USB memory 120. Specifically, the access authenticating unit 260 carries out authentication by displaying, on the display, a graphical user interface prompting the user or the like to input a password, by receiving the password inputted by the user, and by determining whether or not the password is correct. Once succeeding in the authentication, the user or the like can thereafter access the data stored in the readable and writable region 340 of the USB memory 120.

The confidential region accessing unit 265 of the embodiment of the present invention is used for accessing information (including the later described control information 400) residing in the confidential region 360 of the USB memory 120. In the embodiment of the present invention, it is impossible to access the confidential region 360 without passing through the confidential region accessing unit 265. Additionally, the input/output interface 115 of the embodiment of the present invention is capable of exchanging data with the USB memory 120.

Figure 3:
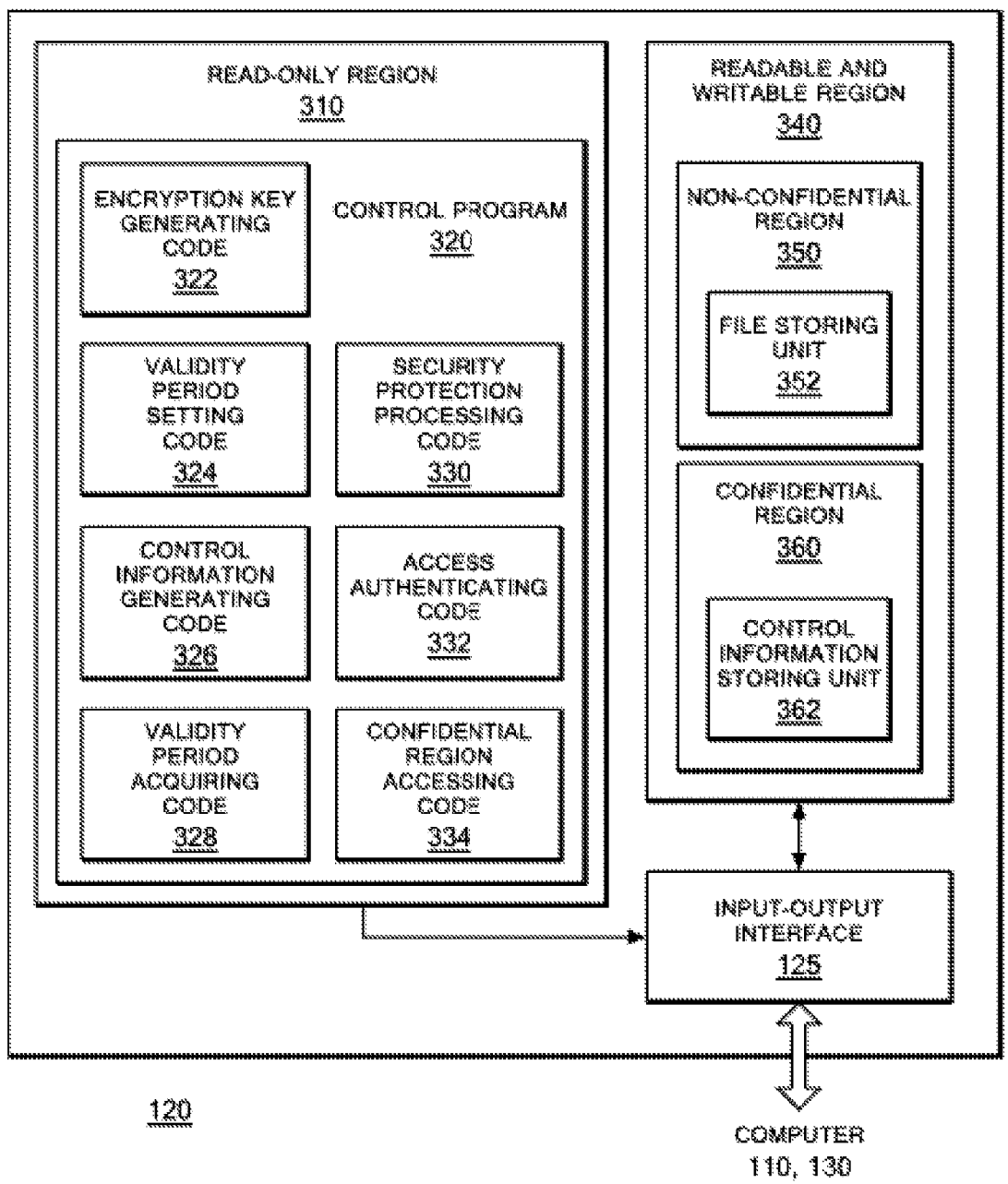
FIG. 3 is a functional block diagram of a USB memory of the embodiment of the present invention.

FIG. 3 is a functional block diagram of the USB memory of the embodiment of the present invention. Elements shown in the functional block diagram in FIG. 3 can be realized by hardware resources, software, or collaboration of hardware resources and software in a USB memory device having a hardware configuration later described by use of FIG. 10.

The USB memory 120 of the embodiment of the present invention includes an input/output interface 125, a read-only region 310 and the readable and writable region 340. Furthermore, the readable and writable region 340 includes a non-confidential region 350 and the confidential region 360. The input/output interface 125 can exchange data with each of the computers 110 and 130.

The read-only region 310 of the embodiment of the present invention has the control program 320 and the like stored at the time of manufacture thereof in an undeletable manner and is a storage region (read-only memory) whose contents cannot be rewritten. There is the control program 320 stored in the read-only region 310.

The control program 320 of the embodiment of the present invention is executed by a processor of an information processing apparatus when the USB memory 120 is connected to the information processing apparatus. The control program 320 includes the encryption key generating code 322, the validity period setting code 324, the control information generating code 326, the validity period acquiring code 328, the security protection processing code 330, the access authenticating code 332 and the confidential region accessing code 334. Functions realized by those codes have been described already with FIG. 2, and therefore, will not be described in detail here.

The readable and writable region 340 of the embodiment of the present invention is a storage region on which a data write/read operation is carried out. The readable and writable region 340 includes the non-confidential region 350 and the confidential region 360. The non-confidential region 350 includes the file storing unit 352 for storing files therein. Additionally, the confidential region 360 of the embodiment of the present invention is a storage region into and from which data can be written and read only via the confidential region accessing unit 265 of the information processing apparatus loaded with the control program 320. The confidential region 360 includes the control information storing unit 362 for storing therein the control information 400 illustrated in FIG. 4. A data structure of the control information 400 will be described below in detail.

FIG. 4 is a diagram expressing one example of a data structure of data stored in the USB memory of the embodiment of the present invention. The data structure 400 of the present invention includes: plural files 450 stored in the file storing unit 352 of the non-confidential region 350; and the control information 400 containing one or more control information blocks which are stored in the control information storing unit 362 of the confidential region 360 and associated with the respective files 450.

The control information 400 of the embodiment of the present invention includes file paths 405, file saved dates and times 410, copy-source apparatus expiration dates and times 415 and copy-destination apparatus expiration dates and times 420. The file paths 405 are used for identifying files associated with the respective control information blocks. Dates and times, which are measured by the current date and time measuring unit 225 of the computer when files associated with the respective control information blocks are saved in the USB memory 120, are recorded as the respective file saved dates and times 410. In the embodiment of the present invention, the file saved dates and times 410 can be updated, every time the USB memory 120 is connected to an information processing apparatus, to a current date and time at that time point when the USB memory 120 is connected thereto.

The copy-source apparatus expiration dates and times 415 of the embodiment of the present invention are expiration dates and times of files associated with the respective control information blocks and are to be used on condition that the USB memory 120 is connected to the personal computer 110 of the user that is a copy-source apparatus. Additionally, the copy-destination apparatus expiration dates and times 420 are expiration dates and times of files associated with the respective control information blocks and are to be used on condition that the USB memory 120 is connected to any one of the different personal computers 130 that is a copy-destination apparatus.

Figure 5:
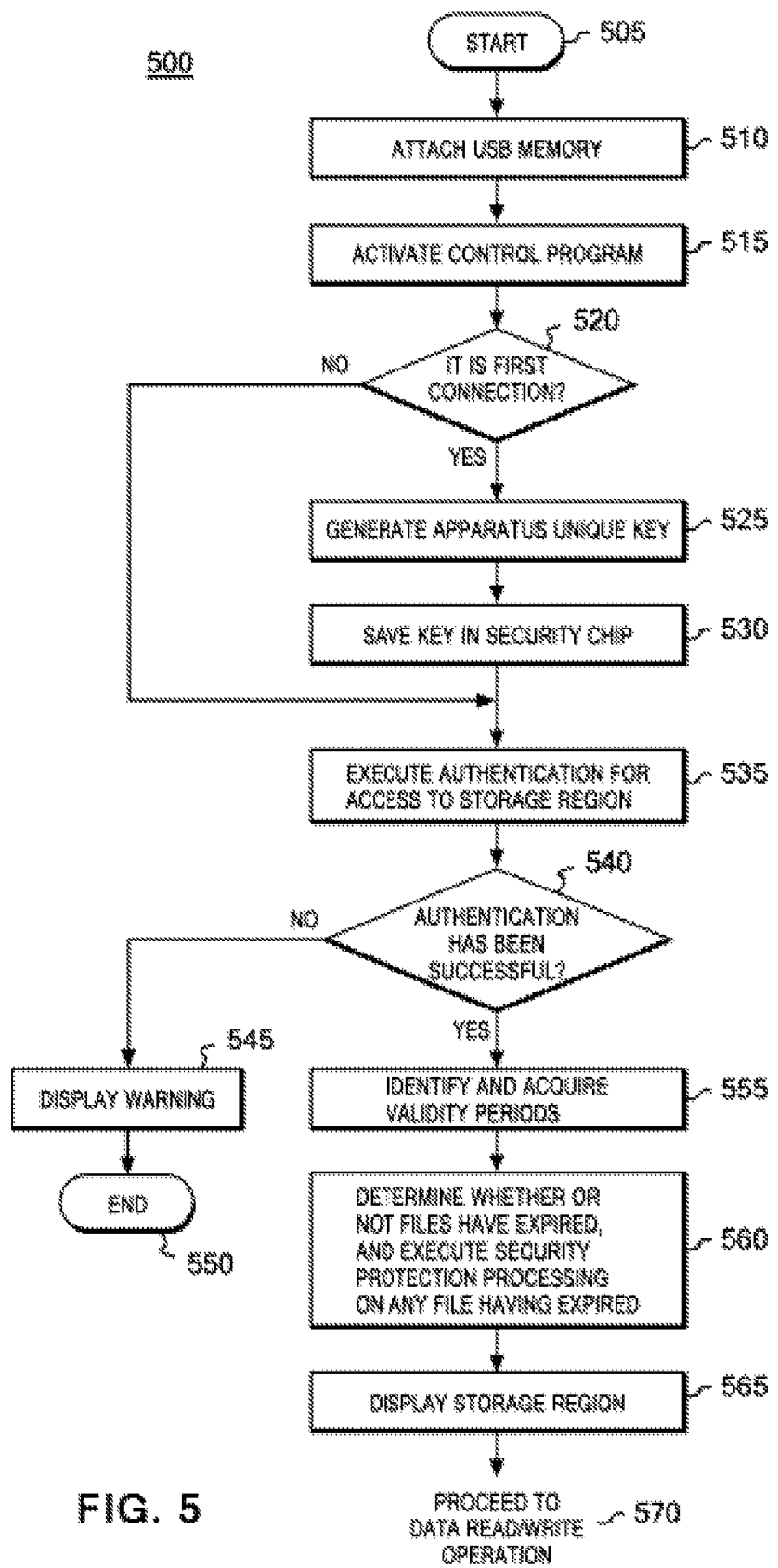
FIG. 5 is a flowchart expressing actions performed when the USB memory and an information processing apparatus of the embodiment of the present invention are connected to each other.

FIG. 5 is a flowchart expressing actions performed when the USB memory and any one of the personal computers of the embodiment of the present invention are connected to each other. Processing thereof starts in step 505, and the USB memory 120 is connected to a USB terminal of an information processing apparatus in step 510. The processing proceeds to step 515, where, with the USB memory 120 activating the control program 320 by loading the control program 320 onto the information processing apparatus, the connection of the USB memory 120 to the information processing apparatus is detected.

The processing proceeds to step 520, where the control program 320 (more specifically, a processor of the information processing apparatus onto which the control program 320 is loaded) determines whether or not it is the first time the USB memory 120 is connected to the information processing apparatus. Specifically, the information processing apparatus is configured to have a list of device IDs of devices recorded therein which have been so far connected to the information processing apparatus, and makes the determination on the basis of whether or not the device ID of the USB memory 120 exists in the list when the USB memory 120 is connected thereto. If it is determined in step 520 that it is not the first time the USB memory 120 is connected to the information processing apparatus, the processing follows an arrow "NO" and proceeds to step 535, where access authentication is executed for an access to the file storage region.

If it is determined in step 520 that it is the first time the USB memory 120 is connected to the information processing apparatus, the processing follows an arrow "YES" and proceeds to step 525. In step 525, the control program 320 generates an encryption key unique to the information processing apparatus to which the USB memory 120 is connected. The processing proceeds to step 530, where the information processing apparatus whose encryption key unique thereto has been generated stores the encryption key in the encryption key storing unit 205. In the embodiment of the present invention, the encryption key is stored in a security chip of the information processing apparatus, whereby security of the encryption key is maintained. Then, the processing proceeds to step 535, where access authentication is executed for an access to the file storage region.

In step 535, access authentication is executed for an access to the file storage region. Specifically, the control program 320 of the USB memory 120 displays, on the display device of the information processing apparatus, a graphical user interface prompting the user to input a password. The authentication is carried out by determining whether or not the password inputted by the user is correct.

In step 540, whether or not the access authentication has been unsuccessful in step 535 is determined. If it is determined in step 540 that the access authentication has been unsuccessful, the processing follows an arrow "NO" and proceeds to step 545, where a warning that the access authentication has ended unsuccessfully for the user is presented on the display of the information processing apparatus, and the processing subsequently proceeds to step 550 and ends.

If it is determined in step 540 that the access authentication has been successful, the processing follows an arrow "YES" and proceeds to step 555, where, from plural validity periods respectively associated with files stored in the USB memory 120 (specifically, a copy-source apparatus validity period and a copy-destination apparatus validity period), a validity period that should be applied to each of the files is identified and acquired in accordance with the information processing apparatus to which the USB memory 120 is connected. Details of step 555 will be described later in detail by use of a flowchart 600 in FIG. 6.

The processing further proceeds to step 560, where whether or not the respective files have expired is determined by use of the validity periods identified and acquired in step 555 that should be applied to the respective files, and the security protection processing is executed on any file determined as having expired. Details of step 555 will be described later in detail by use of a flowchart 700 in FIG. 7. Subsequently, the processing proceeds to step 570, where a data read/write operation is performed by the user.

Figure 6:
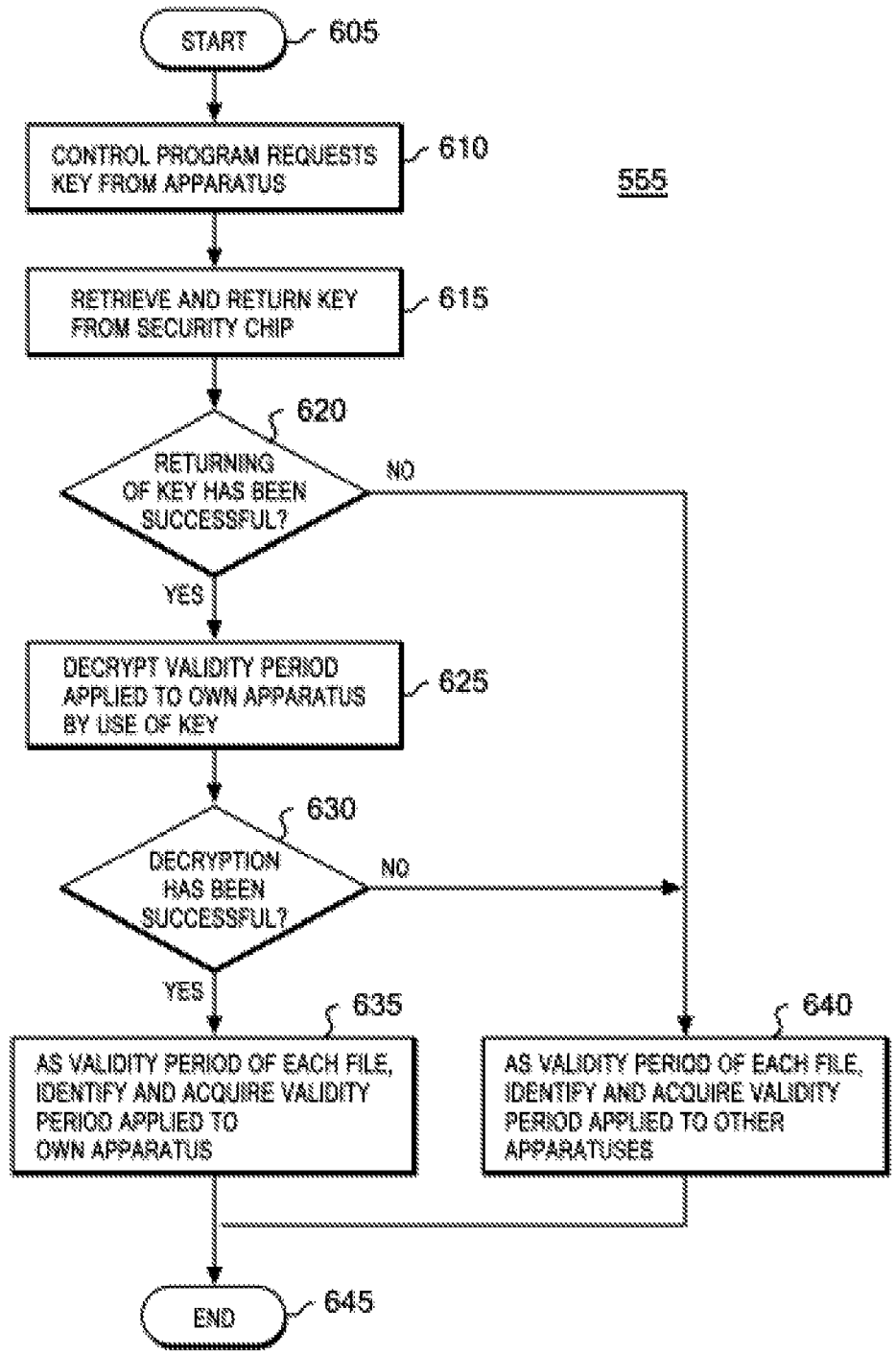
FIG. 6 is a flowchart expressing details of a validity period identifying and acquiring action of the embodiment of the present invention.

FIG. 6 is a flowchart expressing details of step 555 in the flowchart 500 in FIG. 5, that is, a validity period identifying and acquiring action of the embodiment of the present invention. Processing thereof starts in step 605, and, in step 610, in order to decrypt encrypted validity periods, the control program 320 requests an encryption key stored in the information processing apparatus. The processing proceeds to step 615, where the information processing apparatus retrieves the encryption key stored in its security chip, and attempts to return the encryption key to the control program 320.

The processing proceeds to step 620, where whether or not returning of the encryption key has been successful in step 615 is determined. If it is determined in step 620 that the returning of the encryption key has been unsuccessful due to absence of an encryption key in the security chip or some other reason, the processing follows an arrow "NO" and proceeds to step 640, where the copy-destination apparatus validity period is identified and acquired as a validity period of each of the files. If it is determined in step 620 that the returning of the encryption key has been successful, the processing follows an arrow "YES" and proceeds to step 625. In step 625, the control program 320 of the USB memory 120 attempts to decrypt the copy-source apparatus validity periods by use of the encryption key returned from the information processing apparatus.

If it is determined in step 630 that the decryption of the copy-source apparatus validity periods has been unsuccessful due to mismatch of the encryption keys or some other reason, the processing follows an arrow "NO" and proceeds to step 640, where the copy-destination apparatus validity period is identified and acquired as a validity period of each of the files. If it is determined in step 630 that the decryption of the copy-source apparatus validity period has been successful, the processing follows an arrow "YES" and proceeds to step 635, where the decrypted copy-source apparatus validity period is identified and acquired as a validity period of each of the files.

The copy-source apparatus validity periods or the copy-destination apparatus validity periods are identified and acquired as validity periods of the respective files through the above actions, and the processing ends in step 645.

Figure 7:
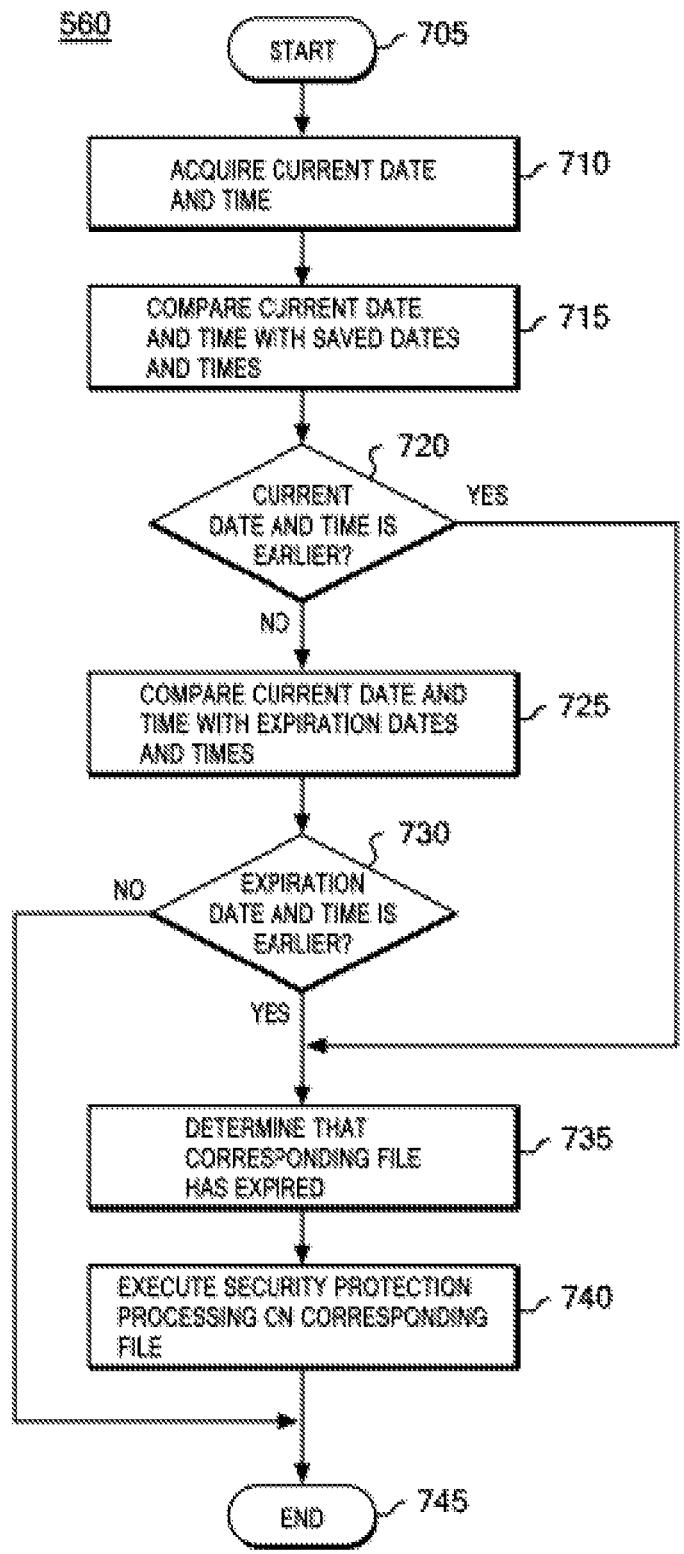
FIG. 7 is a flowchart expressing details of security protecting processing of the embodiment of the present invention performed on a file having expired.

FIG. 7 is a flowchart expressing details of step 560 in the flowchart 500 in FIG. 5, that is, the security protecting processing of the embodiment of the present invention performed on any file having expired. Processing thereof starts in step 705, and the control program 320 acquires current date and time information in step 710. In the embodiment of the present invention, a current date and time is acquired by making an inquiry to the current date and time measuring unit 225 of the information processing apparatus.

The processing proceeds to step 715, where the control program 320 compares the current date and time with the saved dates and times 410 of the respective files. Next, whether or not the current date and time is earlier than each of the saved dates and times 410 in the comparison in step 715 is determined in step 720. If it is determined in step 720 that the current date and time is earlier than any of the saved dates and times 410 of the files, it is highly likely that the current date and time has been falsified through deliberate change of a timer or the like by a wrongful access, and therefore, the processing follows an arrow "YES" and proceeds to step 735, where it is forcibly determined that the files have expired.

If it is determined in step 720 that the current date and time is later than the saved dates and times 410 of the respective files, the processing follows an arrow "NO" and proceeds to step 725, where the control program 320 compares the current date and time with the expiration dates and times of the respective files, which have been identified and acquired in step 555. Next, whether or not the current date and time is earlier than the expiration dates and times of the respective files in the comparison in step 725 is determined in step 730.

If it is determined in step 730 that any one of the expiration dates and times of the respective files is earlier than the current date and time, a file corresponding to that one of the expiration dates and times can be judged as having expired, and therefore, the processing follows an arrow "YES" and proceeds to step 735, where it is forcibly determined that the file has expired. Following the step 735, the processing proceeds to step 740, where the security protection processing is executed on the file having expired. In the embodiment of the present invention, the security protection processing is deletion of any file having expired. Subsequently, the processing proceeds to step 745 and ends.

If it is determined in step 730 that any one of the expiration dates and times of the respective files is later than the current date and time, a file corresponding to that one of the expiration date and time can be considered as not having expired, and therefore, the processing follows an arrow "NO" without executing security protection processing on the file, and proceeds to step 745 and ends.

Figure 8:
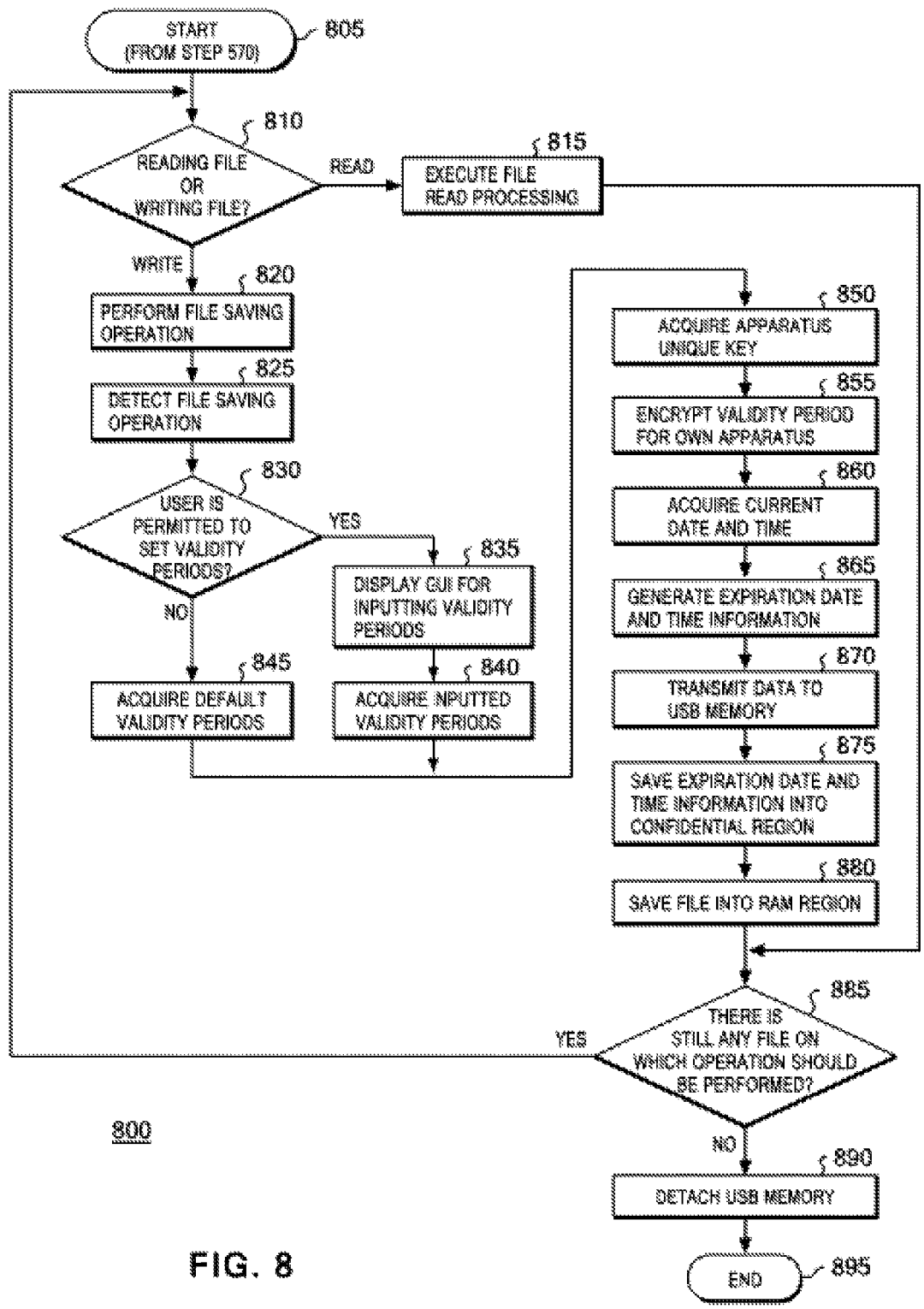
FIG. 8 is a flowchart expressing details of a data writing action, from the information processing apparatus to the external storage device, of the embodiment of the present invention.

FIG. 8 is a flowchart expressing a data read/write action from the information processing apparatus to the external storage device. Processing thereof starts in step 805 in a state where the data read/write operation has become available in step 570 after completion of the processing in the flowchart shown in FIG. 5. Subsequently, whether an operation that should be performed subsequently is "reading a file" or "writing a file" is determined in step 810.

If the operation that should be performed subsequently is determined to be "reading a file" in step 810, the processing follows an arrow "READ" and proceeds to step 815, where file reading processing is executed in accordance with an operation performed by the user. Subsequently, whether or not there is still any file on which an operation of "reading a file" or "writing a file" should be performed is determined in step 885. If it is determined in step 885 that there is a file on which the operation should be performed, the processing returns to step 810.

If the operation that should be performed subsequently is determined to be "writing a file" in step 810, the processing follows an arrow "WRITE" and proceeds to step 820, where a file saving operation is performed by the user. For example, dragging and dropping an icon, which is a metaphor of the file, to the non-confidential region 350 of the USB memory 120, which is displayed as a window on the display of the information processing apparatus, can correspond to the file saving operation performed by the user. However, the file saving operation is not limited to this.

The processing proceeds to step 825, where the file saving action performed in step 820 is detected by a monitoring program being executed on the information processing apparatus, and whether or not the user is permitted to set the validity periods of a file to be saved in response to the detection is determined in step 830.

If it is determined in step 830 that the user is permitted, the processing proceeds to step 835, where a graphical user interface (GUI), which enables the user to input a copy-source apparatus validity period and a copy-destination apparatus validity period of the file that should be saved, is displayed on the display of the information processing apparatus. Subsequently, the program acquires the validity periods inputted by the user via the GUI in step 840, and the processing proceeds to step 850.

If it is determined in step 830 that the user is not permitted to set the validity periods, for example, from a security perspective, default validity periods (both a copy-source apparatus validity period and a copy-destination apparatus validity period) are used, and the processing subsequently proceeds to step 850.

In step 850, the key which is unique to the apparatus and stored in the security chip is acquired in order to encrypt the copy-source apparatus validity period of the validity periods acquired in step 840 or 845. Subsequently, the copy-source apparatus validity period is encrypted by use of the acquired apparatus unique key in step 855, and a current date and time is acquired from the current date and time measuring unit 225 of the information processing apparatus in step 860.

The processing proceeds to step 865, where the control information 400 as shown in FIG. 4 is generated on the basis of information acquired in the earlier steps. Specifically, the data structure of the control information 400 is generated by using: as one of the file paths 405, path information of the save destination of the file, which has been acquired in step 825; as one of the file saved dates and times 410, the current date and time having been acquired in step 860; as one of the copy-source apparatus expiration dates and times 415, the expiration date and time obtained by the copy-source apparatus validity period having been encrypted in step 855; and, as one of the copy-destination apparatus expiration dates and times 420, the expiration date and time obtained by the copy-source apparatus validity period having been acquired in step 840.

Subsequently, in step 870, the information processing apparatus transmits the control information 400, which has been generated in step 865, to the USB memory 120 together with data of the file that should be saved. Upon receipt of the control information 400 and the data of the file, the USB memory saves the control information 400 into its confidential region 360 in step 875, and saves the data of the file into its non-confidential region 350 in step 880, and the processing proceeds to step 885.

In step 885, whether or not there is still any file on which an operation of "reading a file" or "writing a file" should be performed is determined. If it is determined in step 885 that there is a file on which the operation should be performed, the processing returns to step 810.

If it is determined in step 885 that there is no file on which the operation should be performed, the processing proceeds to step 890, where a detaching operation of the USB memory is performed. It is preferable that, in order to safely detach the USB memory, this detaching operation be performed by following a procedure prescribed by the operating system. Thereafter, the processing ends in step 895.

Figure 9:
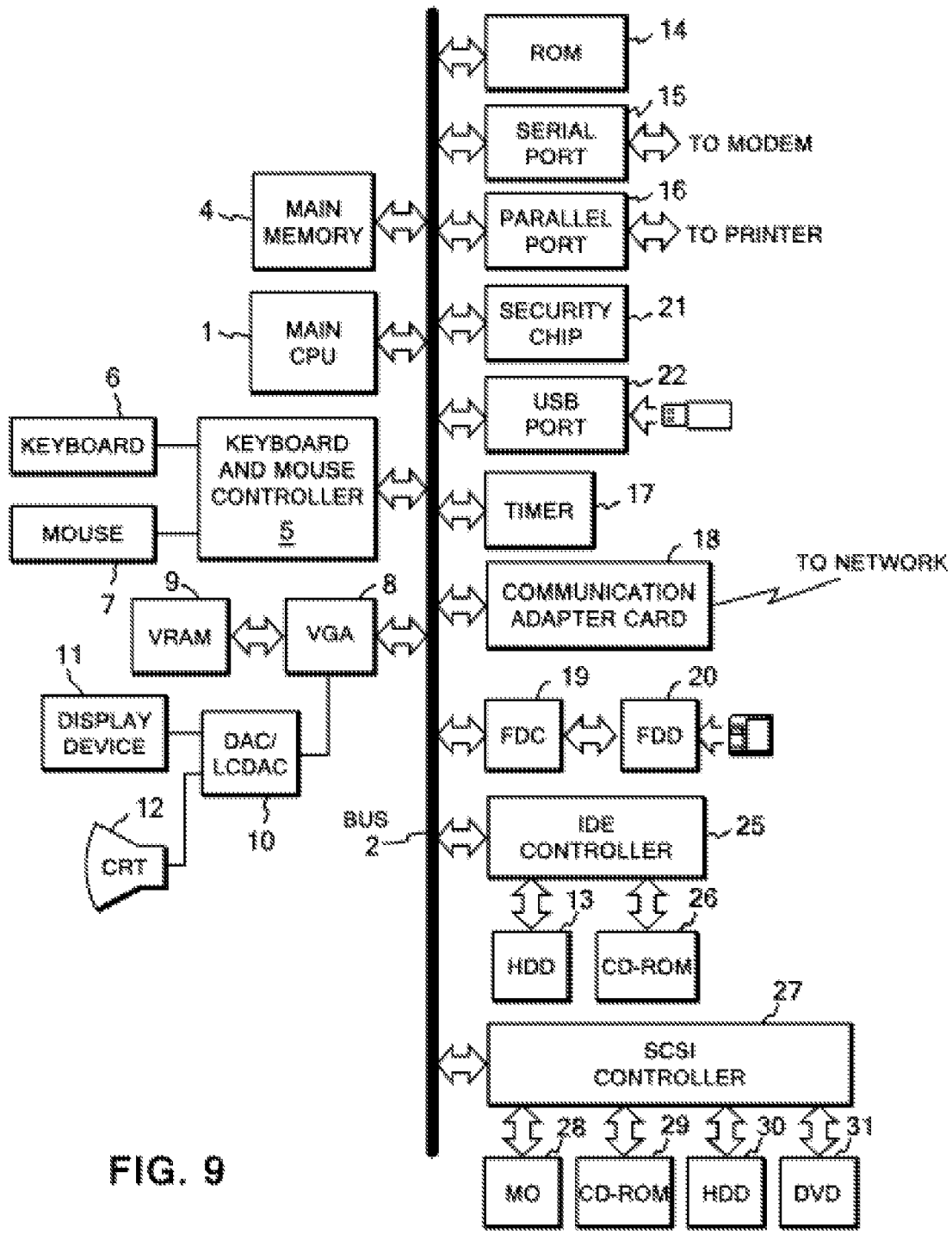
FIG. 9 is a diagram expressing one example of a hardware configuration of an information processing apparatus suitable for realizing the personal computer of the embodiment of the present invention.

FIG. 9 is a diagram expressing one example of a hardware configuration of an information processing apparatus suitable for realizing each of the computers 110 and 130 of the embodiment of the present invention. The information processing apparatus includes the main CPU (central processing unit) 1 and the main memory 4 which are connected to a bus 2. Additionally, removable storages (each being an external storage system in which a recording medium is exchangeable) such as the hard disk drive 13, a hard disk drive 30, CD-ROM drives 26 and 29, a flexible disk drive 20, an MO drive 28 and a DVD drive 31 are each connected to the bus 2 via a floppy disk controller 19, an IDE controller 25, a SCSI controller 27 or the like.

Recording media such as a flexible disk, an MO, a CD-ROM, a DVD-ROM and the like are inserted into the removable storages. These recording media, the hard disk drives 13 and 30 and a ROM 14 can record therein codes of a computer program used for providing instructions to the CPU and the like in cooperation with an operating system and carrying out the present invention. The computer program is executed by being loaded onto the main memory 4. The computer program can be compressed, can be divided into plural pieces to be recorded in plural media, and can be recorded in an external storage device such as a USB memory.

The information processing apparatus accepts inputs from input devices such as a keyboard 6 and a mouse 7 via a keyboard and mouse controller 5. The information processing apparatus is connected to a display device 11 via a DAC/LCDC 10 so as to present visual data to the user. The information processing apparatus is capable of communicating with other computers and the like by being connected to a network via a network adapter 18 (an Ethernet (trademark) card or token ring card) or the like. Although not illustrated, connection thereof to a printer via a parallel port, and connection thereof to a modem via a serial port are also possible.

Additionally, the information processing apparatus includes a security chip 21 and a USB port 22. In the embodiment of the present invention, the security chip 21 is used for securely storing a generated encryption key in the information processing apparatus, and the USB port 22 is used for establishing connection between a USB memory and the information processing apparatus. The security chip can be realized by use of a Trusted Platform Module (TPM) technology designed by Trusted Computing Group. Additionally, for specifications of the USB port 22, please refer to "Universal Serial Bus Revision 2.0 Specification" (available from http://www.usb.org/developers/docs/).

From the above description, it will be readily understood that the information processing apparatus suitable for realizing the system according to the embodiment of the present invention is realized by any one of various information processing apparatuses such as a normal personal computer, a workstation and a mainframe, or by a combination of these information processing apparatuses. However, these components are shown for the illustrative purpose only, and not all of these components are necessarily essential for the present invention.

Needless to say, various modifications may be easily conceived of by those skilled in the art, the various modifications including one in which the hardware components of the information processing apparatus used in the embodiment of the present invention are embodied by using plural machines in combination and distributing functions of the respective hardware components to these machines. Such modifications are ideas included in the concept of the present invention as a matter of course.

Each of the personal computers according to the embodiment of the present invention can employ an operating system that supports a GUI (Graphical User Interface) multi-window environment, such as the Windows (trademark) operating system provided by Microsoft® Corporation, Mac OS™ provided by Apple Computer Incorporated, or a Unix[2]™ based system (for example, AIX[3]® provided by International Business Machines Corporation) provided with the X Window System.

[2] UNIX is a registered trademark of The Open Group in the United States and other countries.
[3] AIX is a registered trademark of IBM Corporation in the United States and other countries.

From the above, it can be readily understood that the system according to the embodiment of the present invention is not limited to a particular operating system environment. In other words, any operating system can be employed as long as the operating system can provide a resource management function that enables application software and the like to utilize resources of a data processing system. Note that, while a hardware resource management function, a file handling function, a spooling function, a job management function, a storage protection function, a virtual storage management function and the like can be included in the resource management function, these functions are well known to those skilled in the art, and therefore, detailed description thereof will be omitted.

Figure 10:
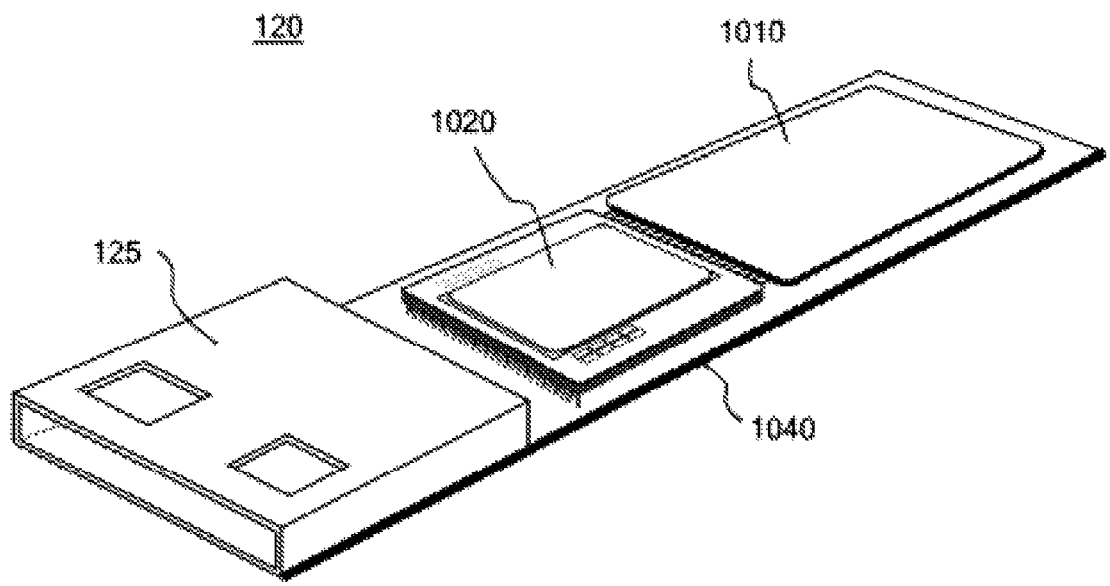
FIG. 10 is a diagram expressing one example of a hardware configuration of the USB memory of the embodiment of the present invention.

FIG. 10 is a diagram expressing one example of a hardware configuration of the USB memory 120 of the embodiment of the present invention. The USB memory 120 of the embodiment of the present invention includes the USB terminal 125, a non-volatile memory 1010 and a controller 1020. As has been described above, for specifications of the USB terminal 125, please refer to "Universal Serial Bus Revision 2.0 Specification" (available from http://www.usb.org/developers/docs/).

The non-volatile memory 1010 and the controller 1020 are arranged on an electronic substrate 1040 and connected to each other. The non-volatile memory 1010 can be realized typically by a flash memory semiconductor. A storage region of the non-volatile memory 1010 includes a read-only region and a readable and writable region. The readable and writable region includes a non-confidential region in which usual files are stored, and a confidential region which can be accessed only by a control program. The controller 1020 can respectively control accesses to the regions of the non-volatile memory 1010 divided in the above manner.

Additionally, the present invention can be realized as hardware, software or a combination of hardware and software. Implementation of the present invention in a data processing system including a predetermined program can be given as a typical example of implementation thereof using a combination of hardware and software. In that case, by being loaded onto and executed by the data processing system, the predetermined program controls the data processing system and executes processing according to the present invention. This program is constituted by a group of instructions expressible by any language, codes and expressions. Such a group of instructions enables the system to execute a particular function directly or after any one of the following two operations is, or both of the two operations are, performed:

1. conversion of the group of instructions into other language, codes and expressions; and
2. copying thereof onto another medium.

Needless to say, the scope of the present invention includes not only the program described above, but also a medium having the program recorded therein. A program used for carrying out the present invention can be stored in any computer readable recording medium such as a flexible disk, an MO, a CD-ROM, a DVD, a hard disk drive, a ROM, an MRAM, a RAM or the like. So as to be stored in a recording medium, such a program can be downloaded from another data processing system connected via a communication line, or can be copied from another recording medium. Additionally, such a program can be compressed or divided into plural pieces to be recorded in one medium or plural media. Additionally, it should be noted that it is obviously possible to provide, in various forms, program products that carry out the present invention.

According to the embodiment of the present invention, it is possible to set plural validity periods for data stored in an external storage device such as a USB memory, and to set different validity periods for the respective information processing apparatuses to which the external storage device is connected, thereby enabling more detailed security control.

According to the embodiment of the present invention, a tighter validity period is set when the external storage device is connected to an information processing apparatus other than a copy-source apparatus. This makes it possible to prevent, without impairing convenience in normal use on the copy-source apparatus for example, leakage of data in an external storage device as much as possible in case where the external storage device is stolen.

According to the embodiment of the present invention, falsification of a current date and time through deliberate change of a timer is detected, and the security protection processing is executed if there is the falsification. Thereby, security of data stored in the external storage device can be enhanced.

It is apparent to those skilled in the art that various modifications and improvements can be added to the above embodiment. For example, although a USB memory is used as the external storage device in the embodiment of the present invention, the present invention can be applied to all of attachable and detachable external storage devices each capable of connection (which may be wireless or wired) to and exchanging data with an information processing apparatus. Such external storage devices include an SD card, a CompactFlash (trademark) (CF) card, an RFID tag, a PCM-CIA memory card and the like, and the way of connection to the information processing apparatus includes IEEE 1394, wireless LAN and the like, but is not limited thereto.

Although the embodiment of the present invention has been described with a notebook personal computer in particular being taken into consideration as each of the information processing apparatuses, it should be noted that information processing apparatuses to which the embodiment of the present invention is applicable include all of information processing apparatuses each capable of storing data therein and exchanging data with an external storage device. Such information processing apparatuses include not only a usual personal computer (notebook, desktop and the like), a workstation, a mainframe and the like, but also a mobile phone, a PDA, a digital multifunctional machine, a printer, a digital camera, a mobile music player, and a combination of any of these.

Although the embodiment of the present invention has been described on the assumption that the control program is executed by a processor of an information processing apparatus upon connection of the USB memory to the information processing apparatus, a processor may be provided outside the information processing apparatus such as inside the USB memory, and caused to execute the control program. Additionally, although the embodiment of the present invention has been described on the assumption that data in the "file" format is exchanged between an external storage device and an information processing apparatus, it should be noted that the present invention is applicable to data in all of various formats.

Although a common key is used for encrypting and decrypting validity periods in the embodiment of the present invention, a pair of an encryption key and a decryption key may be used instead. Furthermore, although deletion of any file having expired is adopted as the security protection processing in the embodiment of the present invention, another form of the security protection processing, such as protection by encrypting any file having expired, is included in the technical concept of the present invention as a matter of course. It should be noted that embodiments obtained by adding such modifications and improvements are also included in the technical scope of the present invention as a matter of course.

Although the preferred embodiment of the present invention has been described in detail, it should be understood that various changes, substitutions and alternations can be made therein without departing from spirit and scope of the inventions as defined by the appended claims.

What is claimed is:

1. An external storage device, comprising:
an input/output interface;
a first storage region; and
a second storage region, wherein
the input/output interface;
the first storage region stores validity period data associated with first and second validity periods,
the first validity period usable upon the external storage device being connected to a first information processing apparatus,
the second validity period usable upon the external storage device being connected to a second information processing apparatus,
the second storage region stores a control program, which when executed by a processor, causes the processor to perform:
establishing connection of the external storage device to the information processing apparatus via the input/output interface;
identifying, based upon the connected information processing apparatus, one of the first and second validity periods to be used for exchanging data using the input/output interface; and
executing, based upon the identified one of the validity periods, predetermined security protection processing on the data.

2. The external storage device of claim 1, wherein
the first validity period is encrypted with an encryption key unique to the first information processing apparatus.

3. The external storage device of claim 2, wherein
the identifying includes
attempting to decrypt the first validity period encrypted with the encryption key unique to the first information processing apparatus; and
upon successfully decrypting the first validity period, identifying the decrypted first validity period as the identified one of the validity periods.

4. The external storage device of claim 2, wherein
upon first connection of the external storage device to the first information processing apparatus, the encryption key unique to the first information processing apparatus is generated.

5. The external storage device of claim 4, wherein
the encryption key is stored in a secure region of the first information processing apparatus.

6. The external storage device of claim 1, wherein
the first validity period is used upon the external storage device being connected to an information processing apparatus of a first user on which an operation of saving the data associated with the first and second validity periods into the external storage device is performed.

7. The external storage device of claim 6, wherein
the second validity period is used upon the external storage device being connected to an information processing apparatus of a second user.

8. The external storage device of claim 1, wherein the first validity period is longer than the second validity period.

9. The external storage device of claim 1, wherein the first and second validity periods are generated upon an operation of saving the data into the external storage device.

10. The external storage device of claim 1, wherein the first storage region includes a confidential region to be accessed via the control program, and the first and second validity periods are stored in the confidential region.

11. The external storage device of claim 1, wherein the identifying includes:
comparing a current date and time with a saved date and time of the data; and
upon the current date and time being earlier than the saved date and time, determining the data as being expired.

12. The external storage device of claim 11, wherein the saved date and time of the data is updated upon connection of the external storage device to the information processing apparatus.

13. The external storage device of claim 1, wherein the executing step includes the steps of:
determining, by comparing a current date and time with the identified validity period, whether or not the data has expired; and
executing the predetermined security protection processing on the data if it is determined in the determining step that the data has expired.

14. The external storage device of claim 1, wherein the first storage region includes a writable region in which the data is stored, and access to the data stored in the writable region is not permitted until the writable region is validated.

15. A method for processing data stored in an external storage device, comprising:
establishing connection of the external storage device to one of first and second information processing apparatuses via an input/output interface;
identifying, based upon the connected information processing apparatus, one of first and second validity periods to be used for exchanging the data using the input/output interface; and
executing, based upon the identified one of the validity periods, predetermined security protection processing on the data, wherein
the external storage device has stored therein the first and second validity periods,
the first validity period usable upon the external storage device being connected to the first information processing apparatus, and
the second validity period usable upon the external storage device being connected to the second information processing apparatus.

16. An external storage device comprising computer usable program code stored therein, which when executed by a processor, causes the processor to perform and/or initiate:
establishing connection of the external storage device to one of first and second information processing apparatuses via an input/output interface
identifying, based upon the connected information processing apparatus, one of first and second validity periods to be used for exchanging the data using the input/output interface; and
executing, based upon the identified one of the validity periods, predetermined security protection processing on the data, wherein
the external storage device has stored therein the first and second validity periods,
the first validity period usable upon the external storage device being connected to the first information processing apparatus, and
the second validity period usable upon the external storage device being connected to the second information processing apparatus.

17. An information processing apparatus connectable to an external storage device, comprising:
an input/output interface via which data is exchanged with the external storage device;
a processor configured to perform and/or initiate:
generating first and second validity periods for the data to be stored in the external storage device, and
saving, into the external storage device via the input/output interface, the first and second validity periods associated with the data, wherein
the first validity period usable upon the external storage device being connected to a first information processing apparatus, and
the second validity period usable upon the external storage device being connected to a second information processing apparatus.

18. The information processing apparatus of claim 17, wherein
the first validity period is encrypted with an encryption key unique to the first information processing apparatus.

19. A method for processing data stored in an external storage device, comprising:
establishing a connection between the external storage device and one of first and second information processing apparatuses via an input/output interface;
generating first and second validity periods for data to be stored in the external storage device; and
saving, into the external storage device via the input/output interface, the data and the first and second validity periods associated with the data, wherein
the first validity period usable upon the external storage device being connected to the first information processing apparatus, and
the second validity period usable upon the external storage device being connected to the second information processing apparatus.

20. A computer program product, comprising:
a storage hardware device having stored therein computer usable program code, which when executed by a processor, causes the processor to perform and/or initiate:
establishing a connection between the external storage device and one of first and second information processing apparatuses via an input/output interface;
generating first and second validity periods for data to be stored in the external storage device; and
saving, into the external storage device via the input/output interface, the data and the first and second validity periods associated with the data, wherein
the first validity period usable upon the external storage device being connected to the first information processing apparatus, and
the second validity period usable upon the external storage device being connected to the second information processing apparatus.

* * * * *